US007499574B1

(12) United States Patent
Yang et al.

(10) Patent No.: US 7,499,574 B1
(45) Date of Patent: Mar. 3, 2009

(54) VIDEO-BASED FACE RECOGNITION USING PROBABILISTIC APPEARANCE MANIFOLDS

(75) Inventors: Ming-Hsuan Yang, San Jose, CA (US); Jeffrey Ho, San Diego, CA (US); Kuang-Chih Lee, San Diego, CA (US)

(73) Assignee: Honda Motor Co., Ltd., Tokyo (JP)

( * ) Notice: Subject to any disclaimer, the term of this patent is extended or adjusted under 35 U.S.C. 154(b) by 728 days.

(21) Appl. No.: 10/703,288

(22) Filed: Nov. 6, 2003

Related U.S. Application Data

(60) Provisional application No. 60/425,214, filed on Nov. 7, 2002, provisional application No. 60/478,644, filed on Jun. 12, 2003.

(51) Int. Cl.
*G06K 9/00* (2006.01)
(52) U.S. Cl. .................................. 382/118
(58) Field of Classification Search ............... None
See application file for complete search history.

(56) References Cited

U.S. PATENT DOCUMENTS

| | | | | |
|---|---|---|---|---|
| 5,164,992 A | * | 11/1992 | Turk et al. ............ | 382/118 |
| 6,272,231 B1 | * | 8/2001 | Maurer et al. ......... | 382/103 |
| 6,345,110 B1 | * | 2/2002 | Niyogi et al. ......... | 382/118 |
| 6,400,828 B2 | * | 6/2002 | Covell et al. ......... | 382/100 |
| 6,671,391 B1 | | 12/2003 | Zhang et al. | |
| 6,741,756 B1 | | 5/2004 | Toyama et al. | |
| 6,873,713 B2 | * | 3/2005 | Okazaki et al. ....... | 382/118 |
| 7,330,566 B2 | * | 2/2008 | Cutler ................. | 382/103 |

OTHER PUBLICATIONS

C. M. Bishop and J. M. Winn, Non-Linear Bayesian Image Modelling, *Proc. European Conf. On Computer Vision*, vol. 1, 2000, 15 pages.

M. J. Black and A. D. Jepson, EigenTracking: Robust Matching and Tracking of Articulated Objects Using a View-Based Representation, *Int'l. J. Computer Vision*, 26(1), 1988, pp. 63-84.

C. Bregler and S. Omohundro, Surface Learning With Applications to Lipreading, *Advances in Neural Information Processing Systems*, 1994, pp. 43-50.

R. Chellappa, C. L. Wilson, and Saad Sirohey, Human and Machine Recognition of Faces: A Survey, *Proc. Of the IEEE*, 83(5), 1995, pp. 705-740.

(Continued)

*Primary Examiner*—Matthew C. Bella
*Assistant Examiner*—Alex Liew
(74) *Attorney, Agent, or Firm*—Fenwick & West LLP; Mark Duell

(57) ABSTRACT

The present invention meets these needs by providing temporal coherency to recognition systems. One embodiment of the present invention comprises a manifold recognition module to use a sequence of images for recognition. A manifold training module receives a plurality of training image sequences (e.g. from a video camera), each training image sequence including an individual in a plurality of poses, and establishes relationships between the images of a training image sequence. A probabilistic identity module receives a sequence of recognition images including a target individual for recognition, and identifies the target individual based on the relationship of training images corresponding to the recognition images. An occlusion module masks occluded portions of an individual's face to prevent distorted identifications.

53 Claims, 16 Drawing Sheets

OTHER PUBLICATIONS

T. F. Cootes, C. J. Taylor, D. H. Cooper, and J. Graham, Active Shape Models—Their Training and Application, *Computer Vision and Image Understanding*, 61(1), Jan. 1995, pp. 38-59.

D. DeCarlo, D. Metaxas, and M. Stone, An Anthropometric Face Model Using Variational Techniques, *Proc. SIGGRAPH*, 1998, pp. 67-74.

G. J. Edwards, C. J. Taylor, and T. F. Cootes, Interpreting Face Images Using Active Appearance Models, *Proc. IEEE Int'l. Conf. On Automatic Face and Gesture Recognition*, 1999, pp. 1-6.

G. J. Edwards, C. J. Taylor, and T. F. Cootes, Improving Identification Performance by Integrating Evidence from Sequences, *Proc. IEEE Conf. On Computer Vision and Pattern Recognition*, 1999, 2 pages.

A. S. Georghiades, P. N. Belhumeur, and D. J. Kriegman, From Few to Many: Illumination Cone Models for Face Recognition Under Variable Lighting and Pose, *IEEE Trans. On Pattern Analysis and Machine Intelligence*, 23(1), Jun. 2001, pp. 643-660.

D. S. Hochbaum and D. B. Shmoys, A Best Possible Heuristic for the k-Center Problem, *Mathematics of Operations Research*, 10(2), May 1985, pp. 180-184.

X. W. Hou, S. Z. Li, H. J. Zhang, and Q. S. Cheng, Direct Appearance Models, *Proc. IEEE Conf. On Computer Vision and Pattern Recognition*, vol. 10, 2001, 6 pages.

A. J. Howell and H. Buxton, Towards Unconstrained Face Recognition From Image Sequences, *Proc. IEEE Int'l. Conf. On Automatic Face and Gesture Recognition*, 1996, pp. 224-229.

M. Isard and A. Blake, A Mixed-State Condensation Tracker With Automatic Model-Switching, 1998, 6 pages.

T. Jebara, K. Russell, and A. Pentland, Mixtures of Eigenfeatures for Real-Time Structure From Texture, *Proc. Int'l. Conf. On Computer Vision*, 1998, 8 pages.

V. Kruger and S. Zhou, Exemplar-Based Face Recognition From Video, *Proc. European Conf. On Computer Vision*, vol. 4, pp. 732-746.

Y. Li, S. Gong, and Heather Liddell, Modelling Faces Dynamically Across Views and Over Time, *Proc. IEEE Conf. On Computer Vision and Pattern Recognition*, vol. 2, 2001, 6 pages.

Y. Li, T. Wang and H. Y. Shum, Motion Texture: A Two-Level Statistical Model for Character Motion Synthesis, *Proc. SIGGRAPH*, 2002, pp. 465-472.

B. Moghaddam, A. Pentland, Probabilistic Visual Learning for Object Representation, *IEEE Trans. Pattern Analysis and Machine Intelligence*, 19(7), Jul. 1997, pp. 696-710.

H. Murase, S. K. Nayar, Visual Learning and Recognition of 3-D Objects From Appearance, *Int'l. J. Computer Vision*, vol. 14, 1995, pp. 5-24.

B. North, A. Blake, M. Isard, J. Rittscher, Learning and Classification of Complex Dynamics, *IEEE Trans. Pattern Analysis and Machine Intelligence*, 22(9), 2000, pp. 1016-1034.

V. Pavlović, J. M. Rehg, T. J. Cham, and K. Murphy, A Dynamic Bayesian Network Approach to Figure Tracking Using Learned Dynamic Models, *Proc. Int'l. Conf. On Computer Vision*, 1999, 8 pages.

A. Pentland, B. Moghaddam, and T. Starner, View-Based and Modular Eigenspaces for Face Recognition, *Proc. IEEE Conf. On Computer Vision and Pattern Recognition*, 1994, pp. 1-7.

S. Romdhani, V. Blanz, and T. Vetter, Face Identification by Fitting a 3D Morphable Model Using Linear Shape and Texture Error Functions, European Conf. On Computer Vision, 2002, pp. 1-15.

A. Samal and P. A. Iyengar, Automatic Recognition and Analysis of Human Faces and Facial Expressions: A Survey, *Pattern Recognition*, 25(1), 1992, pp. 65-77.

A. Schödl, R. Szeliski, D. H. Salesin, and I. Essa, Video Textures, *Proc. SIGGRAPH*, 2000, 10 pages.

G. Shakhnarovich, J. Fisher, and T. Darrell, Face Recognition From Long-Term Observations; *Proc. European Conf. On Computer Vision*, vol. 3, 2002, pp. 1-15.

K. Toyama and A. Blake, Probabilistic Tracking With Exemplars in a Metric Space, *Proc. Int'l. Conf. On Computer Vision*, vol. 2, Dec. 2001, 15 pages.

H. Wechsler, V. Kakkad, J. Huang, S. Gutta, and V. Chen, Automatic Video-Based Person Authentication Using the RBF Network, *Proc. Int'l. Conf. On Computer Vision*, vol. 2, 2001, 9 pages.

W. Y. Zhao and R. Chellapa, Symmetric Shape-From-Shading Using Self-Ratio Image, *Int'l. J. Computer Vision*, 45(1), Jun. 2001, pp. 55-75.

W. Zhao, R. Chellappa, A. Rosenfeld, and P. J. Phillips, Face Recognition: A Literature Survey Technical Report CAR-TR-948, Center for Automation Research, University of Maryland 2000, pp. 1-66.

S. Zhou and R. Chellappa, Probabilistic Human Recognition From Video, *Proc. European Conf. On Computer Vision*, vol. 3, 2002, pp. 681-697.

* cited by examiner

PROBABILISTIC IDENTITY MODULE
230

Identification Control Module
410

Appearance Manifold Module
420

Occlusion Module
430

FIG. 4

OCCLUSION MODULE
430

Mask Generation Module
510

Mask Adjustment Module
520

FIG. 5

1610b
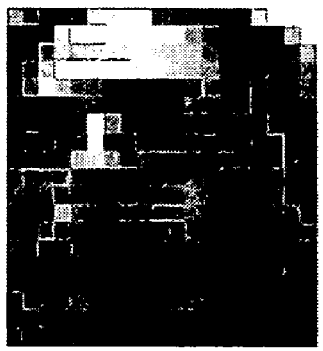
1610a
1620b
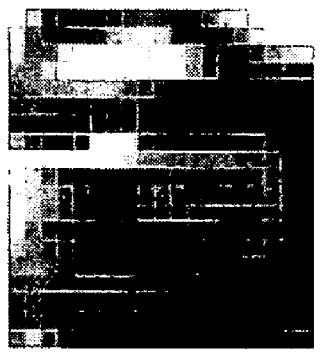
1620b
1610c
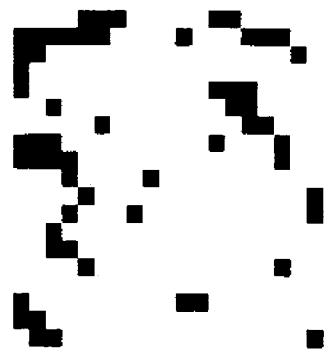
1620c
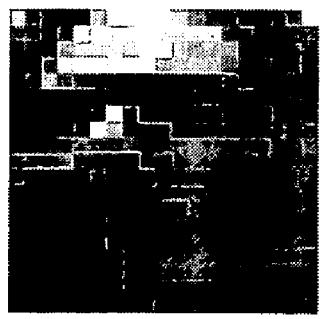
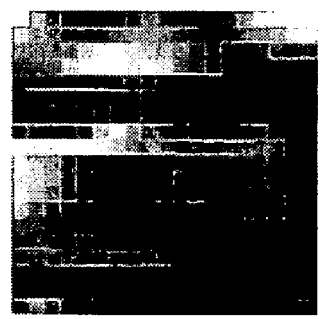
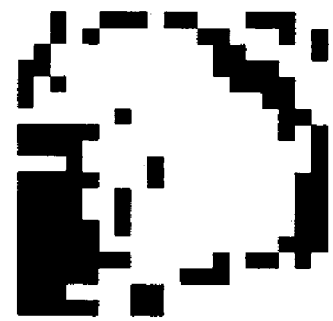
FIG. 16(a)　　　FIG. 16(b)　　　FIG. 16(c)

VIDEO-BASED FACE RECOGNITION USING PROBABILISTIC APPEARANCE MANIFOLDS

CROSS REFERENCE TO RELATED APPLICATIONS

This application is related to U.S. Provisional Patent Application No. 60/425,214, filed on Nov. 7, 2002, entitled "Video-Based Recognition Using Probabilistic Appearance Manifolds," by Ming-Hsuan Yang et al. and U.S. Provisional Patent Application No. 60/478,644 filed on Jun. 12, 2003, entitled "Video-Based Recognition Using Probabilistic Appearance Manifolds" by Ming-Hsuan Yang et al. from which priority is claimed under 35 U.S.C. § 119(e) and which applications are incorporated by reference herein in their entirety. This application is related to co-pending U.S. patent application Ser. No. 10/703,294 filed on Nov. 6, 2003, entitled "Clustering Appearances of Objects Under Varying Illumination Conditions" by Ming-Hsuan Yang et al. which is incorporated by reference in its entirety.

BACKGROUND OF THE INVENTION

1. Field of the Invention

This invention relates generally to object recognition by computers, and more specifically, to facial recognition techniques applied to a sequence of images.

2. Background Art

Computer vision through object recognition is a giant step in computer intelligence that provides a myriad of new capabilities. Facial recognition has particularly valuable applications in verifying a person's identity, robot interaction with humans, security surveillance, etc. With a reliable facial recognition system, computers can provide security clearance for authorized individuals, and robots can perform a set of actions designed for specific individual. However, when currently available facial recognition systems perform identifications, they are limited to basing such identification on a single image generated under ideal circumstances. Examples of currently available facial recognition systems include R. Chellappa, C. L. et al. "Human and Machine Recognition of Faces: A Survey," Proceedings of the IEEE (1995); A. Samal et al. "Automatic recognition and Analysis of Human Faces and Facial Expressions: A Survey," Pattern Recognition (1992); and W. Y. Zhao et al. "Face Recognition: A Literature Survey," Technical Report CAR-TR-948, Center for Automation Research, University of Maryland (2000).

One problem with relying on ideal circumstances, such as assuming that an individual to be recognized is positioned in an ideal pose, is that circumstances are rarely ideal. In an ideal pose, a camera has full frontal view of the face without any head tilt. Any two-dimensional or three-dimensional rotations may either cause a false identification or prevent the camera from collecting a sufficient number of data points for comparison. Even when the individual attempts to position himself for the ideal image, misjudgment in orientation may still be problematic.

Obstacles between the individual's face and the camera create additional problems for conventional recognition systems. Since those systems are incapable of distinguishing an obstacle from the individual's face in a resulting image, the obstacle distorts any following comparisons. As with facial rotations, occluded faces can also prevent the camera from collecting sufficient data.

A problem related to non-ideal circumstances is that typical recognition systems use a single image, so if the single image is distorted, the identification will be affected. False identification can consequently result in security breaches, and the like. Even systems that incorporate more than one image in recognition, such as temporal voting techniques, are susceptible to false identifications. Temporal voting techniques make an identification for a first image, make an independent identification for a second image, and so on, in basing recognition the most frequent independent identification. Examples of temporal voting techniques include A. J. Howell and H. Buxton, "Towards Unconstrained Face Recognition From Image Sequences," Proc. IEEE Int'l Conf. On Automatic Face and Gesture Recognition (1996); G. Shakhnarovich et al., "Face Recognition From Long-Term Observations," Proce. European Conf. On Computer Vision (1992); and H. Wechsler et al. "Automatic Video-Based Person Authentication Using the RBF Network," Proc. Int'l. Conf. On Audio and Video-Based Person Authentication (1997), which are incorporated by reference herein in their entirety. However, each identification is independent of other images. Thus, sustained pose variations and/or occlusions will still distort the outcome.

Therefore, what is needed is a robust facial recognition system that exploits temporal coherency between successive images to make recognition decisions. As such, the system should make accurate identification of target individuals in non-ideal circumstances such as pose variations or occlusions.

SUMMARY OF THE INVENTION

The present invention meets these needs by providing temporal coherence to recognition systems. One embodiment of the present invention comprises a manifold recognition module to perform identification using a sequence of images. A manifold training module receives a plurality of training image sequences (e.g., from a video camera), each training image sequence including an individual in a plurality of poses, and establishes relationships between the images including a target individual for recognition, and identifies the target individual based on the relationship of training images corresponding to the recognition images.

In one embodiment, a partitioning module partitions the training image sequence into pose manifolds, or groups of images related to a pose. The union of pose manifolds defines an appearance manifold for an individual. A linear approximation module transforms the nonlinear appearance manifold into a linear function by linearizing each pose. A transition probability module generates a matrix of probabilistic relationships between the images of the training image sequence.

In another embodiment, an appearance manifold uses transition probabilities to determine which appearance manifold is closest to the recognition image sequence. In one embodiment, if identification information at a time instance falls below an identification threshold, there is no positive identification for that time. Also, positive identifications can change over time based on current identification information.

In still another embodiment, an occlusion module masks occluded portions of an individual's face to prevent distorted identifications. The occlusion module compares a representative pose image to a recognition image to find portions of the recognition image (e.g., individual pixels) with large variations from the pose image. A mask adjustment module examines a binary image based on the variations to construct a weighted mask. Masked portions of an image have a reduced influence on identification information.

BRIEF DESCRIPTION OF THE FIGURES

FIG. 4 is a block diagram illustrating the probabilistic identity module according to one embodiment of the present invention.

FIG. 5 is a block diagram illustrating the occlusion module according to one embodiment of the present invention.

FIGS. 16(a)-(c) illustrate occluded images according to one embodiment of the present invention.

DETAILED DESCRIPTIONS OF THE PREFERRED EMBODIMENTS

Figure 1:
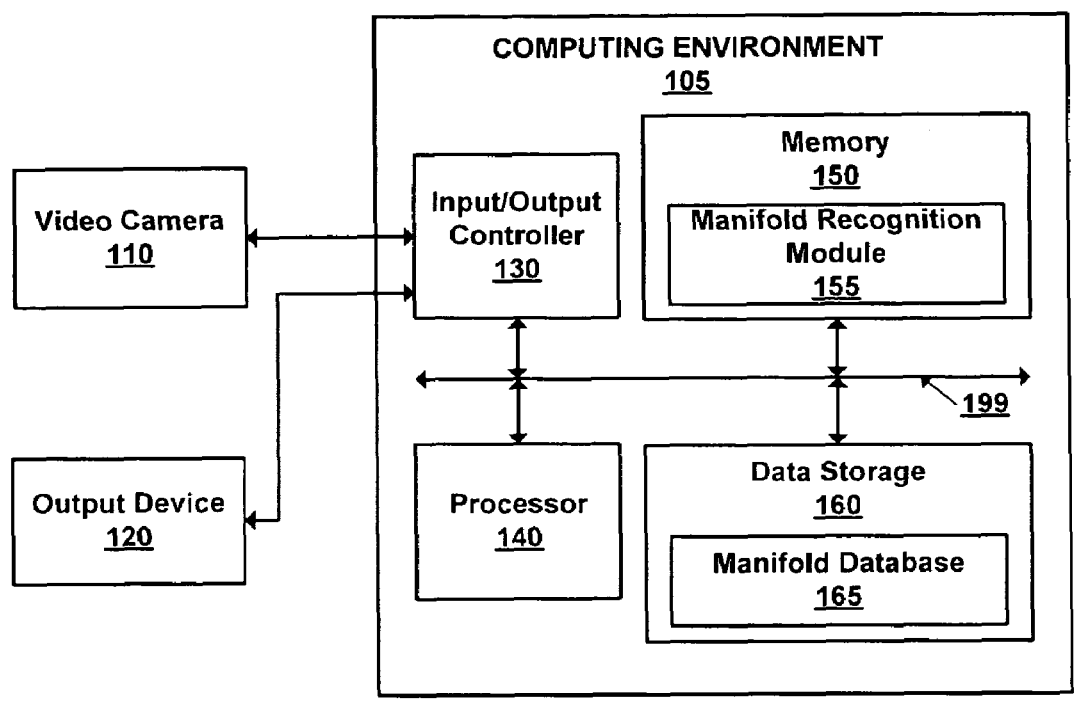
FIG. 1 is a block diagram illustrating a system for manifold appearance recognition according to one embodiment of the present invention.

FIG. 1 is a block diagram illustrating a system for manifold appearance recognition according to one embodiment of the present invention. The system 100 is, for example a robot, a verification system, a security system, or the like. The system 100 comprises a computing environment 105 coupled to a video camera 110 and an output device 120.

The video camera 110 generates a sequence of images that are used for both the training and recognition processes. The images can include an individual. The video camera is, for example, a robot eye, a verification camera, a surveillance camera, or any camera capable of generating the sequence of images. In one embodiment, a first video camera is used for training and a second video camera is used for recognition. In yet another embodiment, the system 100 is loaded with images from a source other than a video camera. The output device 120 is, for example, a display, robot control system, a security response system or any other device that receives recognition output from the computing environment 105.

The computing environment 105 further comprises an input/output controller 130, a processor 140, a memory 150, and data storage 160, each of which is coupled to a bus 199. The input/output controller 130 receives video data from the video camera 110 for processing and sends processed video data to the output device 120. The processor 140, such a Pentium 4 by Intel Corp. of Santa Clara, Calif., an Athlon XP by Advanced Micro Devices, Inc. of Sunnyvale, Calif., an ASIC or an FPG, executes instructions and manipulates data. The memory 150 provides volatile storage of software and data such as the manifold recognition module 155 shown in FIG. 2. The data storage 160 provides non-volatile storage of data such as the manifold database 165 shown in FIG. 3.

Note that the computing environment 105 may be a separate device such as a computer, or a system of components integrated into a host environment such as a robot or a vehicle. The described components can be implemented in hardware, in software executing within hardware, or a combination. Furthermore, the computing environment 105 includes other components such as an operating system, a BIOS, a user interface, etc. While the computing environment 105 and its components may be optimized for appearance manifold recognition, it may also be used for other computing tasks. Methods operating with the system 100 are described below.

Figure 2:
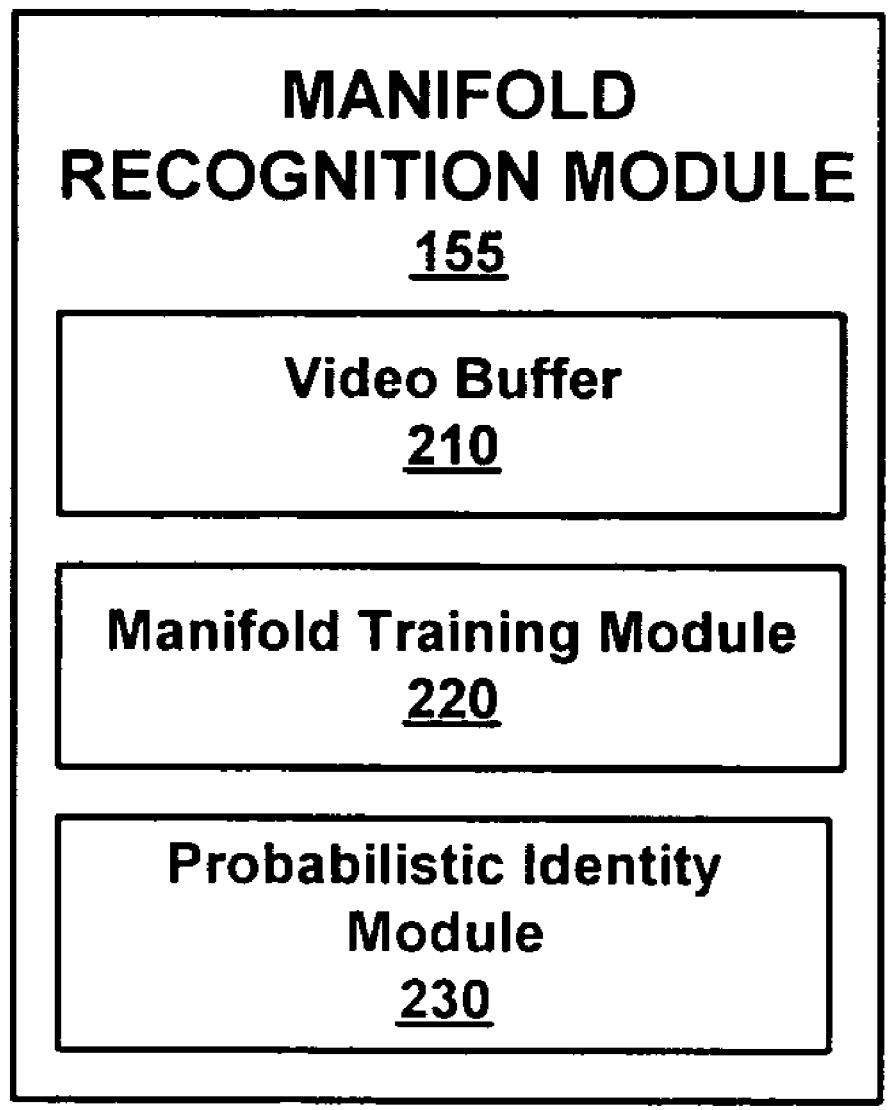
FIG. 2 is a block diagram illustrating the manifold recognition module according to one embodiment of the present invention.

FIG. 2 is a block diagram illustrating the manifold recognition module according to one embodiment of the present invention. The manifold recognition module 155 comprises a video buffer 210, a manifold training module 220, and a probabilistic identity module 230.

Figure 8:
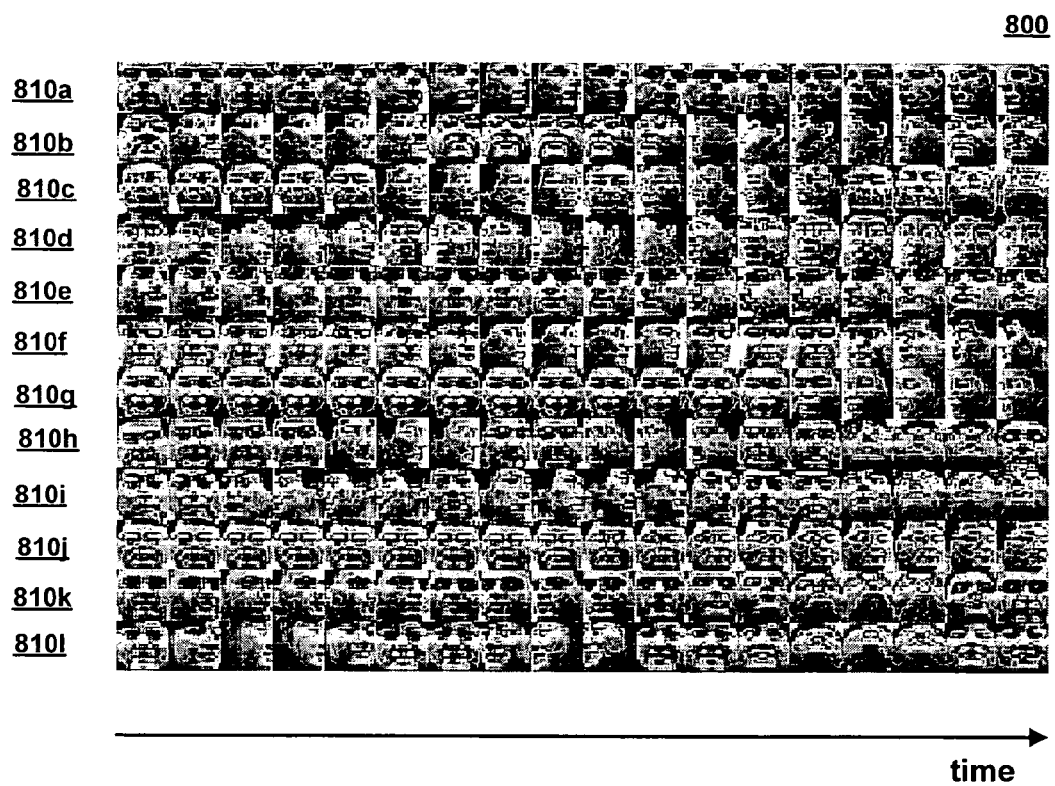
FIG. 8 is an illustration of the plurality of training image sequences according to one embodiment of the present invention.

The video buffer 210 receives video data representing the sequence of images from the video camera 110 as shown in FIG. 8. In a training phase, the video buffer 210 signals the manifold training module 220 to indicate that a training image or sequence of training images is ready for processing. During processing, original and manipulated images are stored in the video buffer 210. After processing, the video buffer 210 stores the training images in the manifold database 165. In a recognition phase, the video buffer 210 signals the probabilistic identity module that a recognition image or sequence of recognition images is ready for processing. The video buffer 210 is, for example, a portion of the memory 150, a separate system, processor memory, or otherwise.

The manifold training module 220 generates a plurality of appearance manifolds from the plurality of training images. Each sequence of training images contains an individual in a variety of poses. The manifold training module 220 processes the images to generate an appearance manifold comprising several pose manifolds. The manifold training module 220 also determines a matrix of probabilities describing the likelihood of a first pose in a first image being followed by a second pose in a second image. The manifold training module 220 stores its results in the manifold training database 165 in association with the individual's image training sequence. The manifold training module 220 and related methods are described in greater detail below.

The probabilistic identity module 230 receives a plurality of recognition images that contain a target individual to be recognized from the plurality of appearance manifolds. The probabilistic identity module 230 considers the interrelationships between recognition images to generate identification information. In one embodiment, the identification information relates to more than one possible identity when there is no single positive identity above an identity threshold. The probabilistic identity module 230 and related methods are described in greater detail below.

Figure 3:
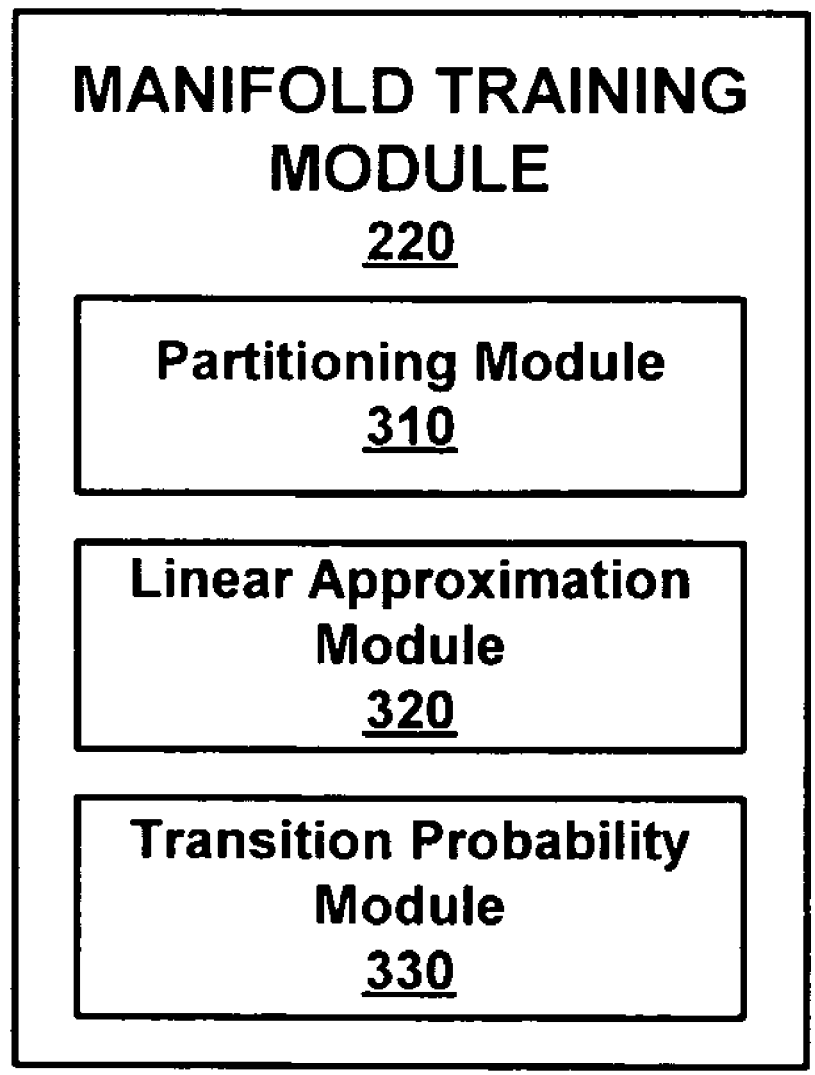
FIG. 3 is a block diagram illustrating the manifold training module according to one embodiment of the present invention.

FIG. 3 is a block diagram illustrating the manifold training module according to one embodiment of the present invention. The manifold training module 220 comprises a partitioning module 310, a linear approximation module 320, and a transition probability module 330.

The partitioning module 310 generates pose manifolds by grouping related training images into partitions. In one embodiment, the partitioning module 310 uses k-means clustering for grouping. The images of each partition are slight variations of a common pose. A pose variation is a two-dimensional or three-dimensional rotation with respect to a reference pose. For example, the individual is facing forward in a first partition, is facing to the right in a second partition, and is facing to the left in a third partition. Additionally, the individual can be facing up or down, have a head tilt, or any combination of the above.

Figure 10:
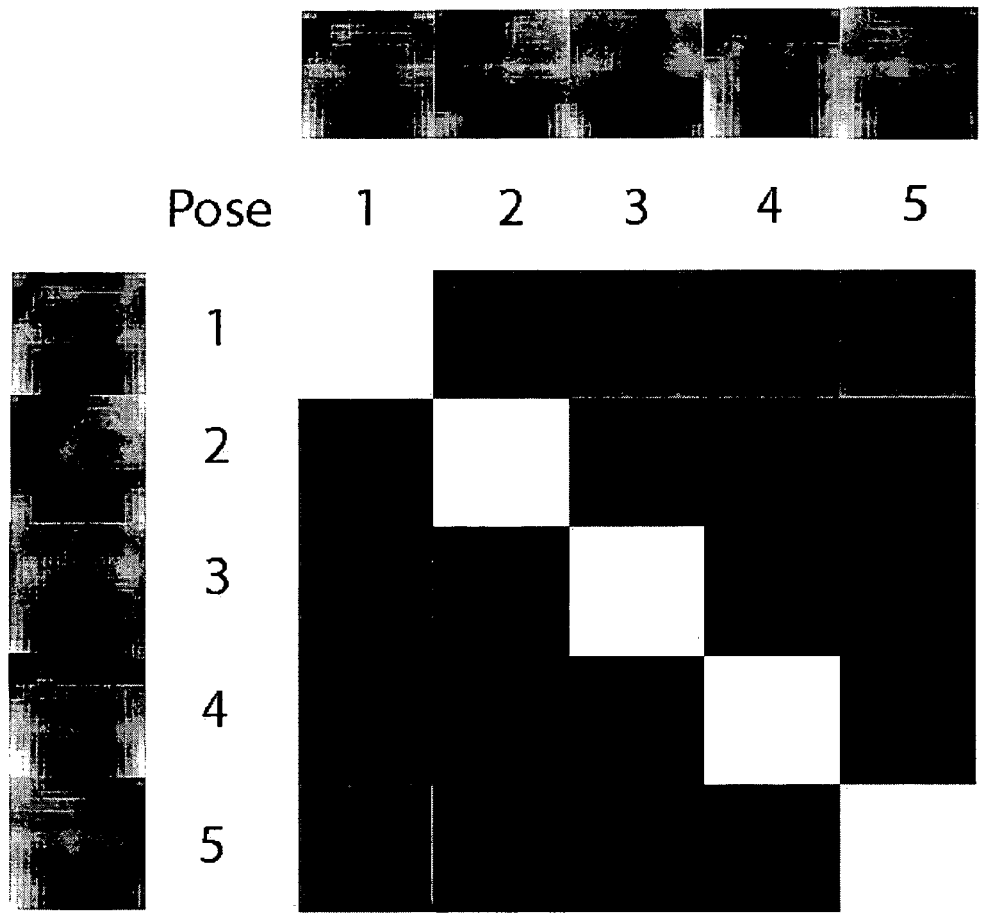
FIG. 10 is an illustration of the transition probability matrix according to one embodiment of the present invention.

The linear approximation module 320 generates a linear approximation of the several pose manifolds. For each pose manifold, the linear approximation module 320 uses PCA (Principal Component Analysis) to determine subspaces represented as affine planes. In one embodiment, the partitioning module 310 generates a representative pose image by combining each partition image into a single image as shown in FIG. 10.

The transition probability module 330 incorporates temporal coherency by determining the relationship between pose manifolds. The relationship, determined by a distance between pose manifolds in the appearance manifold, is expressed as a probability that, given a first pose of the individual, a second pose will follow. In one embodiment, the probabilities are represented as conditional probabilities.

FIG. 4 is a block diagram illustrating the probabilistic identity module according to one embodiment of the present invention. The probabilistic identity module 230 comprises an appearance manifold module 420, and an occlusion module 420.

The identification control module 410 identifies the target individual by determining which pose manifold is closest to the recognition images. The identification control module 410 assesses identification information, and if it meets an identification threshold, outputs the identification.

The appearance manifold module 420 determines identification information based on a target individual's pose variations over time. The identification information may comprise one or more potential identifications. For example, a first recognition image may be nearly the same distance to pose manifolds of two individuals, so the appearance manifold 420 continues to consider both individuals as the potential target individual for the following recognition images. The determination is based on the likelihood of a current pose manifold in a current recognition image given previous pose manifolds in previous recognition images. In one embodiment, the appearance manifold module 420 calculates a joint conditional probability comprising a transition probability between the current and immediately previous poses, and an immediately previous joint conditional probability result.

The occlusion module 420 determines identification information by masking portions of the target individual that are blocked from view from the identification process. Referring to FIG. 5, the occlusion module 420 further comprises a mask generation module 510 and a mask adjustment module 520. The mask generation module 510 generates an occlusion mask by determining which pixel clusters have the greatest variance from the representative pose image. In applying the mask while generating identification information, the mask adjustment module 520 reduces the weighting of masked pixels or removes them from the identification process.

Figure 6:
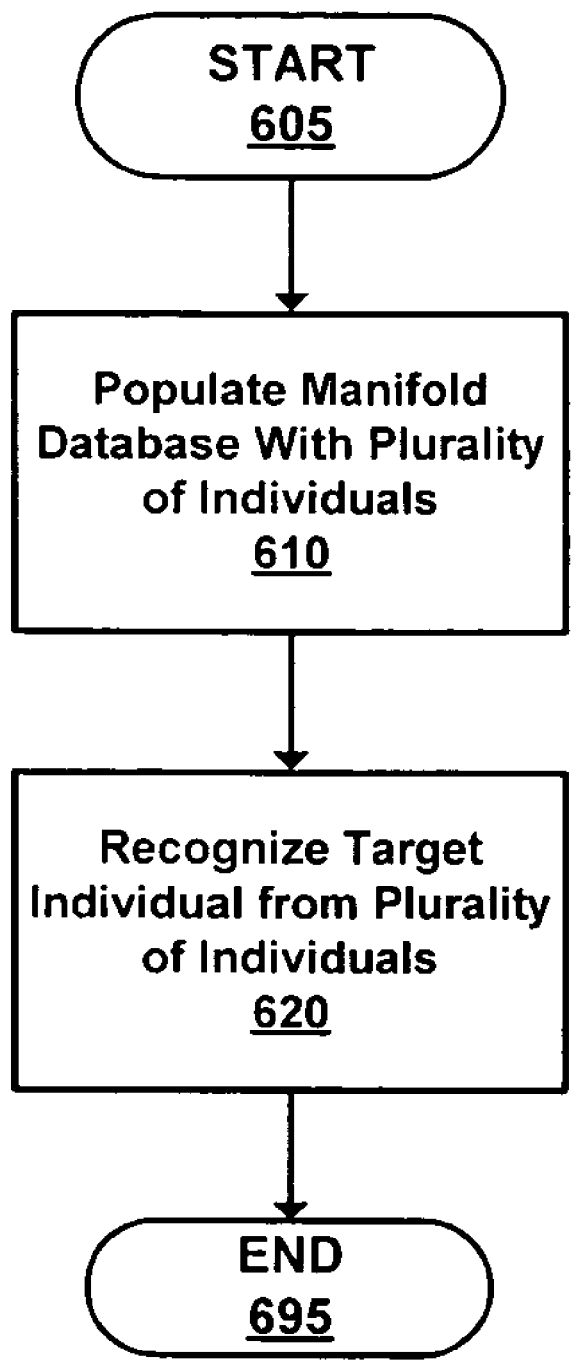
FIG. 6 is a flow chart illustrating a method of manifold appearance recognition according to one embodiment of the present invention.

FIG. 6 is a flow chart illustrating a method of manifold appearance recognition according to one embodiment of the present invention. The process initializes 605 in response to receiving an image in the computing environment 105 from the video camera 110. Generally, the manifold recognition module 155 operates in two phases: in a training phase, the manifold training module 220 populates 620 the manifold database 165 with a plurality of individuals by analyzing the training image sequence; and in a recognition phase, the probabilistic identity module 230 recognizes 620 a target individual 620 from a plurality of individuals.

Figure 7:
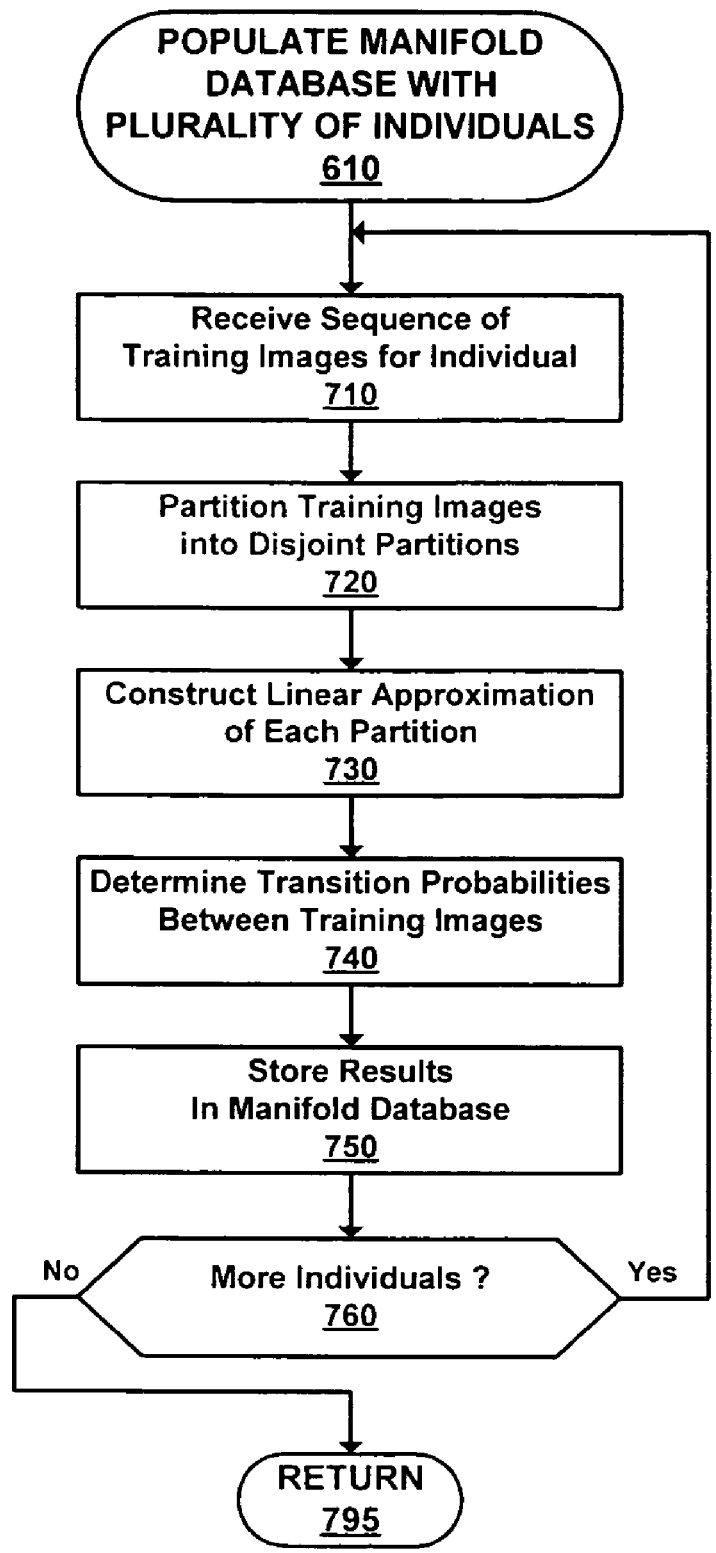
FIG. 7 is a flow chart illustrating the method of populating the manifold database according to one embodiment of the present invention.

The population step 610 is now described in greater detail with reference to FIGS. 7-10. FIG. 7 is a flow chart illustrating the method of populating 610 the manifold database 165 according to one embodiment of the present invention. The population step 610 initializes responsive to receiving 710, in the video buffer 210, a set $S_k$ of one or more consecutive training images $I_l$ for an individual k as expressed in (1):

$$S_k = \{I_1, I_2, \ldots, I_l\} \quad (1)$$

In one embodiment, training images are distinguished from recognition images by a user, a bit, a signal, or in response to operating in the training phase. For example, a user can mount a hard drive having training image sequences to the computing environment 105 and initialize training analysis through a user interface. In another example, an individual within view of the video camera 110 moves naturally or in a predetermined pattern of two-dimensional and three-dimensional movements. In another embodiment, if the probabilistic identity module 230 fails to recognize the target individual in the images, the manifold recognition module 155 enters the training phase, thereby treating received images as training images.

Figure 9:
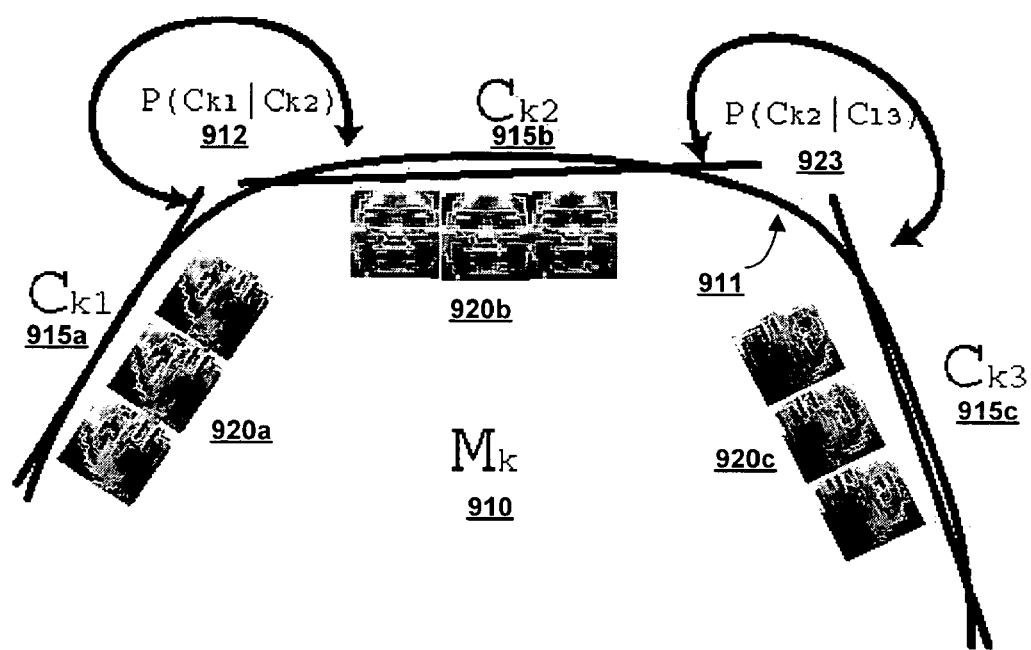
FIG. 9 is an illustration of the image partitions with a linearly approximated appearance manifold comprising pose manifolds according to one embodiment of the present invention.

FIG. 8 is an illustration of the plurality of training image sequences according to one embodiment of the present invention. One of ordinary skill in the art will recognize that the plurality of training images 800 is merely illustrative, and does not limit the scope of the present invention. The plurality of training images 800 comprises several rows of training image sequences 810a-l, each row representing a different individual (e.g., 810a). An image sequence represents an individual in varying poses over time. Subsequent images may be categorized as separate poses, or a variant of the same pose as shown in FIG. 9. Time increments between subsequent images are, for example, $\frac{1}{24}^{th}$, $\frac{1}{30}^{th}$, $\frac{1}{60}^{th}$ of a second, or any other time increment. Individual training images are received directly from the video camera 110, interpolated from surrounding frames, or otherwise constructed. The image format is, for example, JPEG (Joint Photographic Experts Group), GIF (Graphics Interchange Format), BMP (BitMaP), TIFF (Tagged Image File Format), or the like.

Referring to FIG. 7, the partitioning module 310 partitions 720 the training image sequence into m disjoint subsets. Each disjoint subset represents a pose and variations thereof as shown in FIG. 9. Pose variations are two-dimensional or three-dimensional rotations between images. Example poses include: facing forward, facing left, facing right, facing up, facing down, or the like. Example variations of the facing forward pose include: head tilting left, head tilting right, or the like. In another embodiment, the above variations are poses themselves. Indeed, one of ordinary skill of the art will recognize that the poses and variations are merely illustrative, and that many other embodiments are within the scope of the present invention.

In one embodiment, the partitioning module 310 uses a k-means clustering algorithm for grouping images. An example of k-means clustering is described in D. Hochbaum and D. Shmoys "A Best Possible Heuristic For the K-Center Problem," Mathematics of Operations Research (1985). In a first iteration, m seeds having the largest Hausdorff distance ($L^2$) from each other in the image space represent the partitions centers. Each image associates with the closest seed. In repetitive iterations, the partition centers are recalculated based on a distance between the center and grouped images. The optimized partition centers are pose manifolds ($C_k$). The total set of pose manifolds comprise an appearance manifold ($M_k$) for an individual.

Referring again to FIG. 7, the linear approximation module 320 constructs 730 a linear approximation of each partition. FIG. 9 is an illustration of the image partitions with a linearly approximated appearance manifold comprising pose manifolds according to one embodiment of the present invention. The appearance manifold 910 is initially a nonlinear image space representation of the training image sequence 911. The image partitions comprise a left-facing pose 920a, a front-facing pose 920b, and a right-facing pose 920c. Each pose has three associated images that are variations of main poses with a linear approximation representing that subspace 915a-c. The union of the subspaces forms the linear approximation of the appearance module.

In one embodiment, the linear approximation module 320 constructs the linear approximations 915a-c by calculating a PCA plane of fixed dimension for the images. The PCA plane (i.e., subspace) is constructed to provide a compact low-dimensional representation of an object (e.g., face, mug, or any 3D object).

In FIG. 7, the transition probability module 330 determines 740 transition probabilities, or temporal coherence, between training images. Transition probabilities between abutting pose manifolds is shown in FIG. 9. The expression $P(C^{k1}|C^{k2})$ 912 represents the probability the second pose follows the first. Further, the expression $P(C^{k2}|C^{k3})$ 923 represents the probability the third pose follows the first. A more comprehensive set of relationships between poses is represented in a transition matrix as shown in FIG. 10.

In one embodiment, the transition probability module 330 determines transitional probabilities by counting the actual transitions between different disjoint subsets $S_i$ observed in the image sequence as shown in (2):

$$p(C^{ki} | C^{kj}) = \frac{1}{\Lambda_{ki}} \sum_{q=2}^{t} \delta(I_{q-1} \in S_{ki}) \delta(I_q \in S_{kj}) \quad (2)$$

where $\delta(I_q \in S_{kj})=1$ if $I_q \in S_{kj}$ and otherwise it is 0. The normalizing constant $\Lambda_{ki}$ ensures that (3):

$$\sum_{j=1}^{m} p(C^{ki} | C^{kj}) = 1 \quad (3)$$

where $p(C^{ki}|C^{kj})$ is set to a constant k.

FIG. 10 is an illustration of the transition probability matrix according to one embodiment of the present invention. The transition probability matrix 1000 comprises five poses from a training image sequence. For this example, with respect to (3), m=5. The poses have an associated image, which is generated in one embodiment by combining partition images such as the three images in the first partition 910. The brighter blocks have a higher transition probability. Pose 1 is thus much more likely to follow pose 2 than pose 5 because rather than transitioning directly from the left-facing pose to the right-facing pose over two consecutive images, it is highly likely to pass through at least one intermediate pose. This process puts a first order Markov process or finite state machine over a piecewise linear structure.

The transition probability module 330 stores 750 results of the transition probability matrix in the manifold database 165 for use in the recognition phase. The process 610 continues populating the database if there are more individuals 760. Otherwise, it returns 795 until called for recognition.

Figure 11:
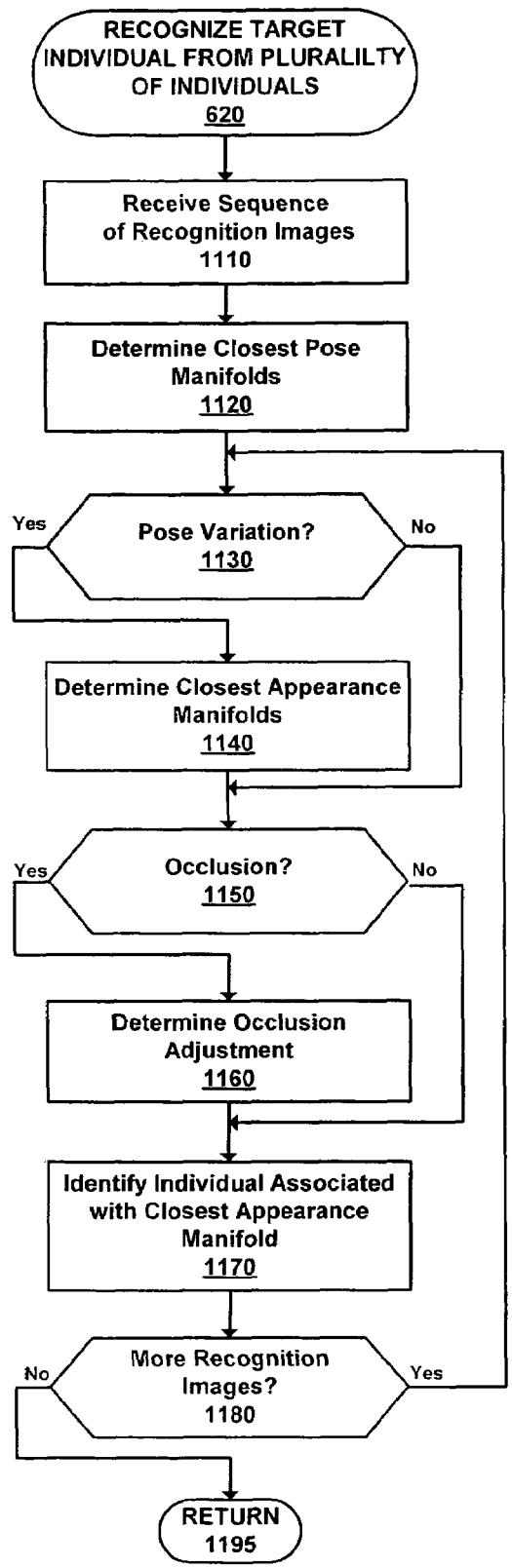
FIG. 11 is a flow chart illustrating a method of recognizing the individual from a plurality of individuals according to one embodiment of the present invention.

Returning to FIG. 6, the recognition step 620 is described in greater detail with reference to FIGS. 11-17. FIG. 11 is a flow chart illustrating a method of recognizing the individual from a plurality of individuals according to one embodiment of the present invention. The process initializes responsive to receiving 1110 one or more recognition images. For example, when an individuals requests authentication and stands in proper view, a video camera sends the sequence of recognition images to the video buffer 210.

Figure 12:
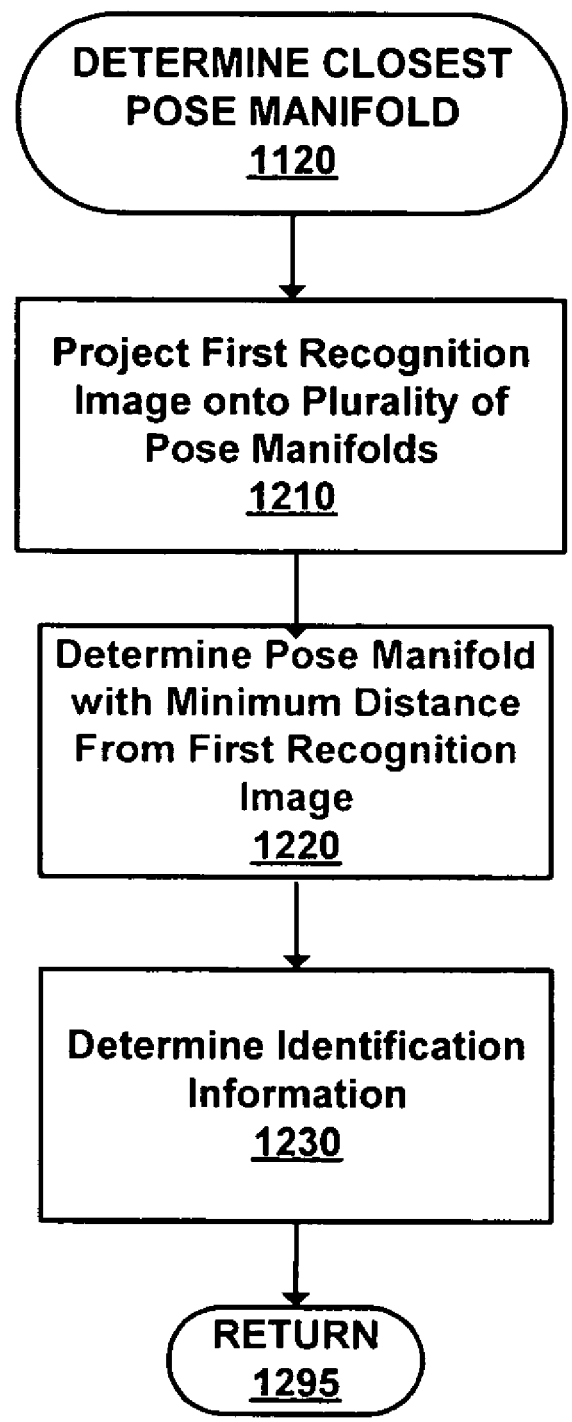
FIG. 12 is a flow chart illustrating the method of determining the pose manifold according to one embodiment of the present invention.

The appearance manifold module 420 determines 1120 which pose manifold, from the plurality of pose manifolds associated with the plurality of individuals, is closest to a first recognition image. FIG. 12 is a flow chart illustrating the method of determining the pose manifold according to one embodiment of the present invention. The first recognition is projected 1210 onto a plurality of pose manifolds, either from the same appearance manifold as shown in FIG. 13 or different appearance manifolds.

If there is no pose variation 1130 or occlusion 1150 detected, the appearance manifold module 420 identifies 1170 an individual associated with a closest appearance manifold. If there are more recognition images 1180, the process repeats. Otherwise, it returns 1195 and ends 695.

The appearance manifold module 420 determines 1220 which pose manifold is closest to the first image in the image space. Examples of image plotting in the ambient space are shown in H. Murase and S. K. Nayar "Visual Learning and Recognition of 3-D Objects From Appearance," Int'l J. Computer Vision (1995). Identification information includes 1230 the appearance manifold associated with the closest pose manifold. The individual associated with the closest pose manifold is a candidate for the target individual's identity. In one embodiment, the identification information includes statistics on more than one candidate since the leading candidate can change based on following recognition images considered in combination with the first recognition image.

Figure 13:
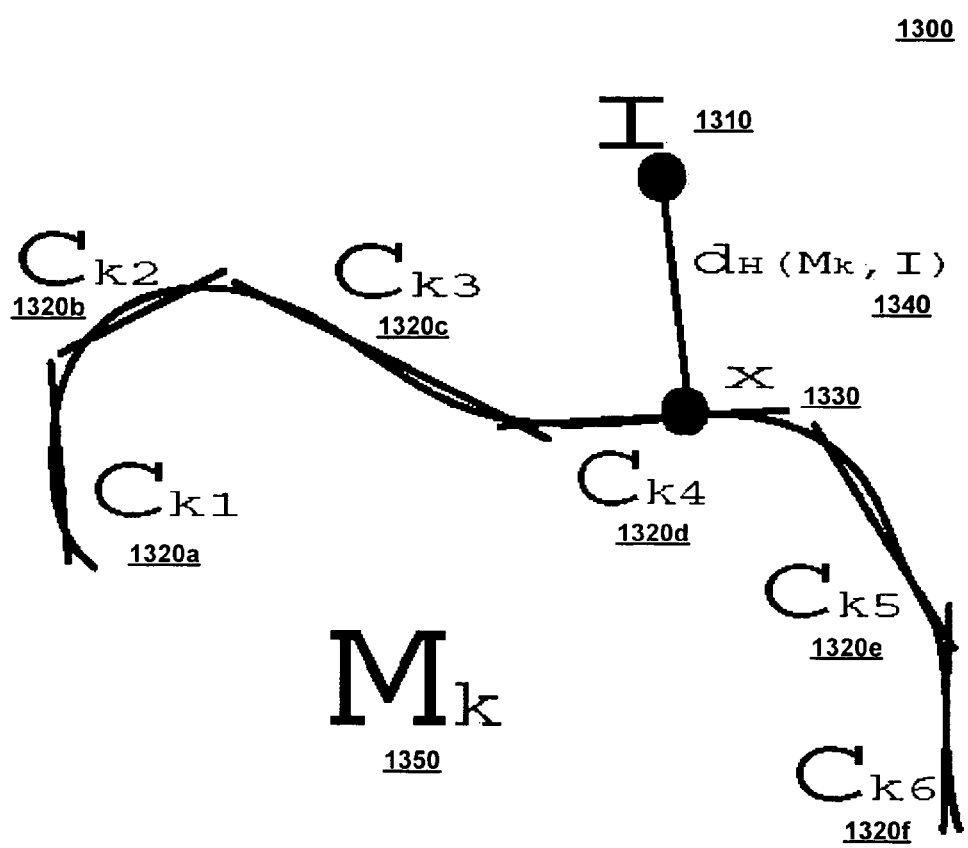
FIG. 13 is an illustration of a recognition image projected onto a pose according to one embodiment of the present invention.

FIG. 13 is an illustration of a recognition image projected onto a closest pose manifold according to one embodiment of the present invention. A point I 1310 is a vector representation of a recognition image. The linearized appearance manifold comprises the set of pose manifolds $C^{k1}$ through $C^{k6}$ 1320a-f. The variable x 1330 represents a minimum distance $d_H$ 1340 between the image 1310 and set of pose manifolds 1320a-f, which in this case is $C^{k4}$ 1320d. Assuming that x 1330 is the closest to among pose manifolds associated with other appearance manifolds, an individual associated with the shown appearance manifold 1350 is the leading candidate for identification.

In one embodiment, for a target individual k, an identity k*, is determined by finding the appearance manifold $M_k$ with the minimum distance $d_h$ to the recognition image I as shown in expression (4):

$$k* = \underset{k}{\operatorname{argmin}} d_H(I, M_K) \quad (4)$$

where $d_H$ is the Hausdorff distance ($L^2$) between the image and closest appearance module. Probabilistically, expression (4) results from defining the conditional probability as shown in expression (5):

$$p(k | I) = \frac{1}{\Lambda} \exp\left(\frac{-1}{\sigma^2}(d_H)^2(I, M_k)\right) \quad (5)$$

Referring again to FIG. 11, if there is a pose variation 1130, the appearance manifold module 420 determines 1140 which appearance manifolds are closest to the recognition image sequence. The appearance manifold module 420 projects the second image onto the plurality of pose manifolds to find the pose manifold closest to the second image in the ambient space. The minimum distance is derived from the second image considered in combination with the first image to incorporate temporal dependency. In one embodiment, the minimum distance is expressed as (6) through (8):

$$d_H(I, M_K) = \int_{M_K} d(x, I) p_{M_K}(x | I) dx \quad (6)$$

$$= \sum_{i=1}^{m} p(C^{ki} | I) \int_{C^{ki}} d_H(x, I) p_{P_{Cki}}(x | I) dx \quad (7)$$

$$= \sum_{i=1}^{m} p(C^{ki} | I) d_H(I, C^{ki}) \quad (8)$$

where x 1330 is a point on the manifold $M_k$ for $1 \leq i \leq m$.

A second identification information is based on the probability that the second pose module follows the first pose module. In one embodiment, the probability is determined from a conditional joint probability including the transition probability from the training phase as expressed in (9) through (11) using Baye's rule:

$$p(C_t^{ki} | I_t, I_{0:t-1}) = \alpha p(I_t | C_t^{ki}, I_{0:t-1}) p(C_t^{ki} | I_{0:t-1}) \quad (9)$$

$$= \alpha p(I_t | C_t^{ki}) \sum_{j=1}^{m} p(C_t^{ki} | C_{t-1}^{kj}, I_{0:t-1}) p(C_{t-1}^{ki} | I_{0:t-1}) \quad (10)$$

$$= \alpha p(I_t | C_t^{ki}) \sum_{j=1}^{m} p(C_t^{ki} | C_{t-1}^{kj}) p(C_{t-1}^{ki}, | I_{0:t-1}, I_{0:t-2}) \quad (11)$$

where $\alpha$ is a normalization term to ensure a proper probability distribution.

In still another embodiment, the appearance manifold module 420 determines the second identification information from preprocessed identification information rather than an image. The preprocessed identification information is derived as discussed above from previous image.

If the second identification information has a probability above an identification threshold, a positive identification can be made from the appearance manifold 410 associated with the closest pose manifold. In one embodiment, the appearance manifold module 420 outputs the identity to an output device 120.

In one embodiment, if the second identification information is not above the identification threshold, parallel statistics are maintained for possible identifications. As the process continues through iterations in response to receiving more recognition images, identification information is updated, and a positive identification is made when the identification threshold is surpassed. Whether or not a positive identification has been made, the process constantly updates identification information responsive to receiving new images.

Figure 14:
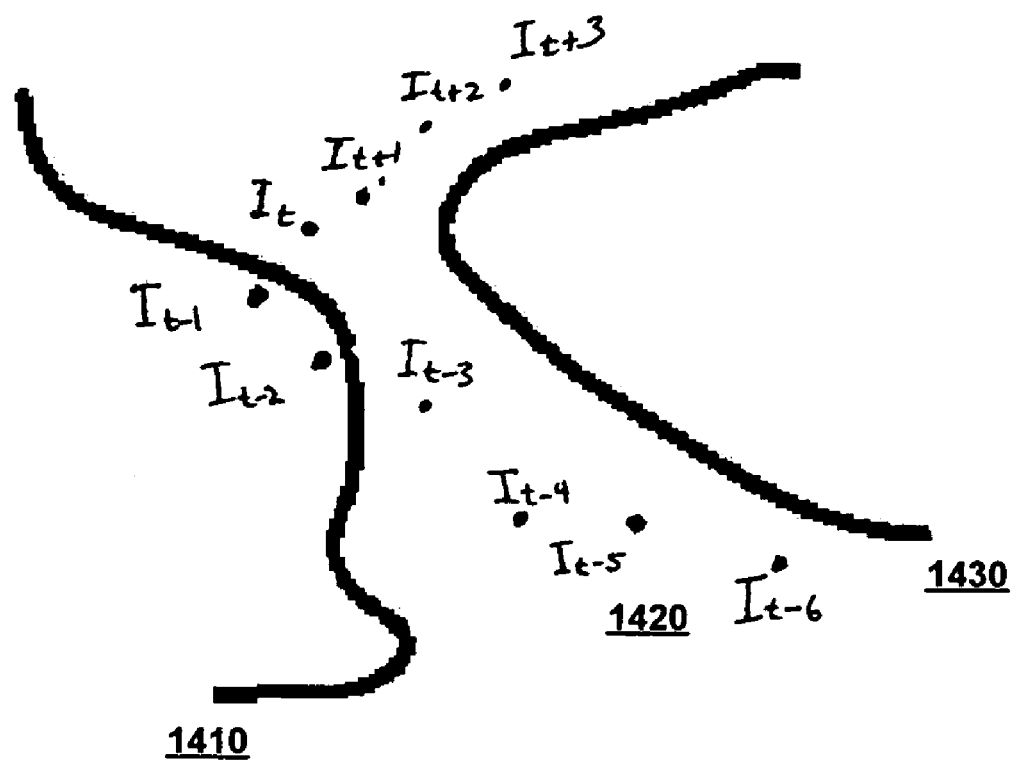
FIG. 14 is an illustration of a sequence of recognition images projected onto two appearance manifolds according to one embodiment of the present invention.

FIG. 14 is an illustration of a sequence of recognition images projected onto two appearance manifolds according to one embodiment of the present invention. The recognition image sequence 1420 spans from time t−6 through t+3. From t−6 through t−4, the recognition image sequence is closest to appearance manifold B 1430 in the ambient space. Thus, the identification information includes an associated identity. However, during t−3 through t, the recognition image sequence 1420 is closest to appearance manifold A 1510. In one embodiment, at time instances t−4 and t−3, the identification information includes both appearance manifolds 1410, 1430 since the recognition image sequence 1420 is not sufficiently close to either one for a positive identification. From t+1 through t+3, the recognition image sequence 1420 is again closest to appearance manifold B 1430. But then, at t and t+1, there is no positive identification.

Advantageously, with each additional recognition image, a new data point is added to the appearance manifold. Therefore, recognition accuracy increases over time.

Figure 15:
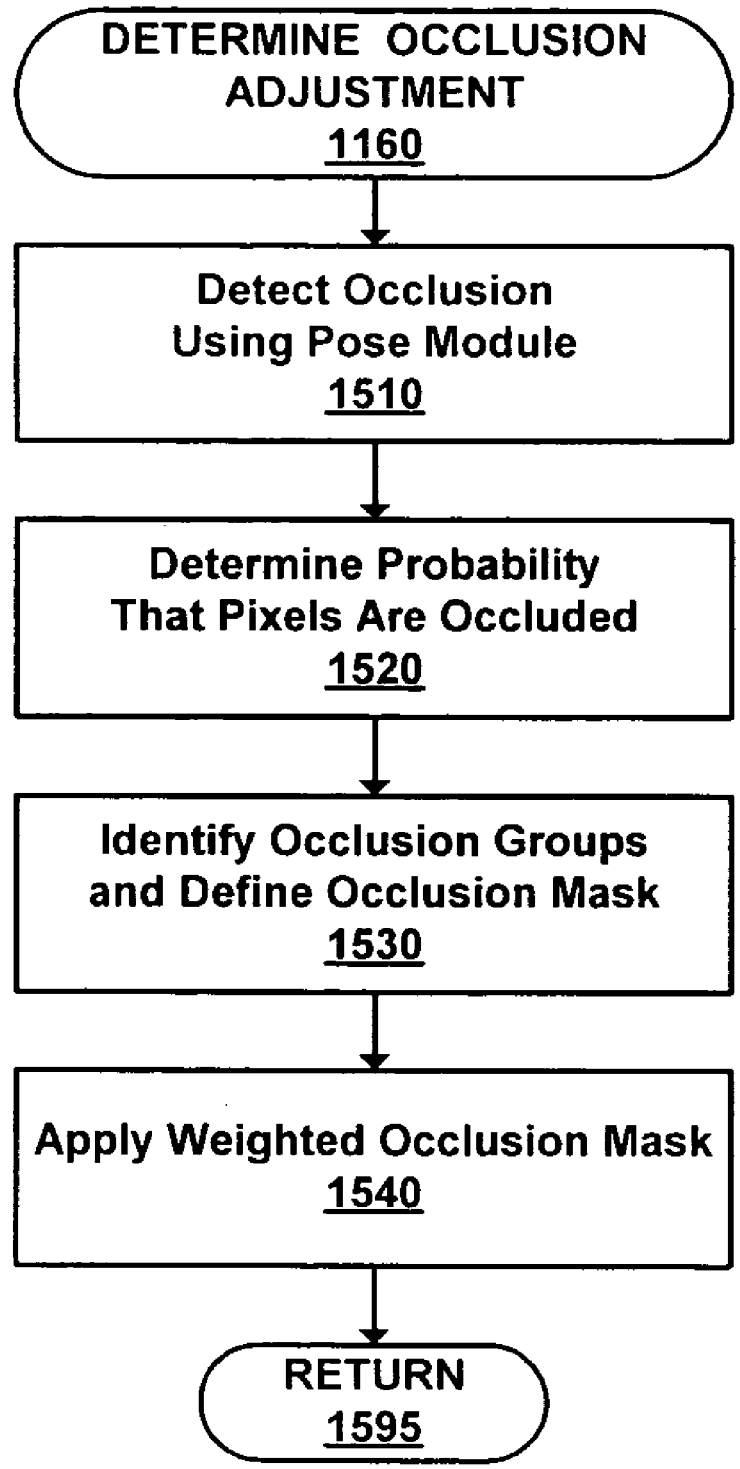
FIG. 15 is a flow chart illustrating the method of determining an occlusion adjustment according to one embodiment of the present invention.

In FIG. 11, if an occlusion is detected 1150, the occlusion module 420 determines 1160 an occlusion adjustment. FIG. 15 is a flow chart illustrating the method of determining an occlusion adjustment according to one embodiment of the present invention. An occlusion occurs when an object blocks the video camera's 110 view of the individual, or an image becomes otherwise obstructed. FIG. 16(a) illustrates a first image with an occlusion 1610a and a second image without an occlusion 1610b, with both images comprising the same individual in the same pose.

The mask generation module detects 1510 the occlusion by comparing the image to its closest pose module as in step 1120 or the closest pose module associated with an appearance module selected in step 1140. FIG. 16(b) illustrates the pose module associated with the first and second image 1620a-b, which are preferably the same pose modules.

The mask generation module 420 determines 1520 a probability that each pixel is occluded. In one embodiment, the probability is measured by how much a pixel varies in color from the corresponding pose module image pixels; a large variation corresponding to high probability and a zero or negligible variation corresponding to a low probability. FIG. 16(c) illustrates a grayscale representation of the first image 1630a and the second image 1630b. Pixels with a large variation are designated black, while pixels with no variation are designated white, and pixels with a medium variation are designated an appropriate shade of gray. In one embodiment, variation data is binary and thus represented in black and white.

The mask adjustment module 520 identifies 1530 occlusion groups and defines a resulting occlusion mask. In the example of FIG. 16(c), the lower left hand region of the first binary image 1630a includes a cluster of black pixels indicating a large group of pixels with high variation in color across frames. The cluster, and resulting occlusion mask thus corresponds to the occlusion shown in the image 1610*a*.

The mask adjustment module 520 applies 1540 a weighted occlusion mask to the pose manifold by reducing the influence of masked pixels on future decisions. By contrast, in one embodiment of determining the appearance manifold in step 1120, all pixels are treated equally. When the next recognition image is received, the mask may be applied directly to the recognition image, or to the pose manifolds in determining the closest pose or appearance manifold.

In one embodiment, the masked pixels are weighted by modifying the distance computation $d_H(M_k, I_t)$ to $d_H(M_{k*}, W_t*I_t)$. The weighted projection of $W_t*I_t$ on $M_{k*}$, is $x*$. The mask $W_t$ updates with each successive image $I_t$ by the estimate at a previous frame $W_{t-1}$ by (12):

$$W_t^{(1)} = \exp\left(\frac{-1}{2*\sigma^2}(\hat{I}_{x*} - I_t)*(\hat{I}_{x*} - I_t)\right) \quad (12)$$

where $\hat{I}_{x*}$ is the reconstructed image. In another embodiment, $W_t$ is iteratively updated based on $W_t^{(1)}$ and $\hat{I}_{x*}^{(1)}$ as in (13):

$$W_t^{i+1} = \exp\left(\frac{-1}{2*\sigma^2}(\hat{I}_{x*}^{(i)} - I_t)*(\hat{I}_{x*}^{(i)} - I_t)\right) \quad (13)$$

until the difference between $W_t^i$ and $W_t^{i-1}$ is below a threshold value at the i-th iteration.

Advantageously, the occlusion mask also exploits temporal coherency to allow more accurate facial recognition.

In summary, the present invention exploits temporal coherency between images during a recognition phase to increase facial recognition accuracy. The manifold training module 220 establishes a matrix of probabilistic interrelationships between a sequence of recognition images for an individual with varying poses. The appearance manifold module 420 uses prior evidence and the probabilistic relationships between received images to make current identification decisions. The occlusion module 430 achieves even further accuracy by masking non-facial parts of the recognition image from identification decisions.

The above description is included to illustrate the operation of the preferred embodiments and is not meant to limit the scope of the invention. The scope of the invention is to be limited only by the following claims. From the above discussion, many variations will be apparent to one of ordinary skill in the art that would yet be encompassed by the spirit and scope of the invention.

We claim:

1. A method for recognizing a target individual, comprising the steps of:
    receiving a first recognition image from a sequence of recognition images, said first recognition image including a first image of the target individual in a first pose, the first recognition image captured at a first time;
    receiving a second recognition image of the sequence of recognition images, said second recognition image including a second image of the target individual in a second pose, the second recognition image captured at a second time;
    generating a first identification information comprising a candidate identity of the target individual based on the first image; and
    generating a second identification information comprising an updated identity of the target individual based on the first identification information and a likelihood that the second pose will follow the first pose in the sequence of recognition images.

2. The method of claim 1, wherein the second pose is a facial position having a two-dimensional rotation with respect to the first pose.

3. The method of claim 1, wherein the second pose is a facial position having a three-dimensional rotation with respect to the first pose.

4. The method of claim 1, wherein the step of generating the second identification information comprise generating the second identification information based on a conditional probability that defines a relationship between the first identification information and the second image.

5. The method of claim 1, wherein the step of generating the first identification information comprises the steps of:
    generating a first vector representation of the first image; and
    projecting the first vector representation onto a plurality of vector representations representing a plurality of individuals; and
    selecting one or more vector representations from the plurality of vector representations having the least distance from the first vector representation.

6. The method of claim 5, wherein the plurality of vector representations are pose manifolds associated with the plurality of individuals.

7. The method of claim 5, further comprising the steps of:
    generating the plurality of vector representations from a plurality of training image sequences including the plurality of individuals.

8. The method of claim 5, wherein the plurality of vector representations are linear approximations of a plurality of image sequences including the plurality of individuals.

9. The method of claim 1, further comprising the steps of:
    if the second identification information exceeds an identification threshold for an individual, identifying the target individual as the individual.

10. The method of claim 1, further comprising the steps of:
    receiving a third recognition image at a third time, the third recognition image including a third image of the target individual at a third time; and
    generating a third identification information, said identification information based on the third image and the second identification information.

11. A method for recognizing a target individual, comprising the steps of:
    receiving a first recognition image from a sequence of recognition images, said first recognition image including a first image of the target individual at a first time;
    receiving a second recognition image of the sequence of recognition images, said second recognition image including a second image of the target individual at a second time;
    generating a first identification information from the first image;
    detecting that a portion of the second recognition image is at least partially occluded;
    generating a weighted mask including the portion of the second image; and
    generating a second identification information from the second image, as adjusted by the weighted mask, and the first identification information.

12. The method of claim 11, wherein the step of detecting the occlusion further comprises the step of:

determining that a group of pixels in the second image exceeds a variance threshold.

13. The method of claim 12, wherein the step of determining that the group of pixels in the second image exceeds a variance threshold comprises:
determining that a first group of pixels in the second image exceeds a variance threshold with respect to a corresponding group of pixels in the first image.

14. A method for recognizing a target individual from an image, comprising the steps of:
receiving a first identification information comprising a candidate identity of the target individual based on one or more recognition images at a previous time;
generating a second identification information comprising an updated identity of the target individual based on a recognition image at a current time; and
determining an identification of the target individual from a plurality of individuals based on a conditional probability given the first identification information and the recognition image at the current time.

15. A computer program product, comprising:
a computer-readable medium having computer program instructions and data embodied thereon for recognizing a target individual from a plurality of individuals, comprising the steps of:
receiving a first recognition image from a sequence of recognition images, said first recognition image including a first image of the target individual in a first pose, the first recognition image captured at a first time;
receiving a second recognition image of the sequence of recognition images, said second recognition image including a second image of the target individual in a second pose, the second recognition image captured at a second time;
generating a first identification information comprising a candidate identity of the target individual from the first image; and
generating a second identification information comprising an updated identity of the target individual based on the first identification information and a likelihood that the second pose will follow the first pose in the sequence of recognition images.

16. The computer program product of claim 15, wherein the second pose is a facial position having a two-dimensional rotation with respect to the first pose.

17. The computer program product of claim 15, wherein the second pose is a facial position having a three-dimensional rotation with respect to the first pose.

18. The computer program product of claim 15, wherein the step of generating the second identification information comprises generating the second identification information based on a conditional probability that defines a relationship between the first identification information and the second image.

19. The computer program product of claim 15, wherein the step of generating the first identification information comprises the steps of:
generating a first vector representation of the first image; and
projecting the first vector representation onto a plurality of vector representations representing a plurality of individuals; and
selecting one or more vector representations from the plurality of vector representations having the least distance from the first vector representation.

20. The computer program product of claim 19, wherein the plurality of vector representations are pose manifolds associated with the plurality of individuals.

21. The computer program product of claim 19, further comprising the steps of:
generating the plurality of vector representations from a plurality of training image sequences including the plurality of individuals.

22. The computer program product of claim 19, wherein the plurality of vector representations are linear approximations of a plurality of image sequences including the plurality of individuals.

23. The computer program product of claim 15, further comprising the steps of:
if the second identification information exceeds an identification threshold for an individual, identifying the target individual as the individual.

24. The computer program product of claim 15, further comprising the steps of:
receiving a third recognition image at a third time, the third recognition image including a third image of the target individual at a third time; and
generating a third identification information, said third identification information based on the third image and the updated identification information.

25. A computer program product, comprising:
a computer-readable medium having computer program instructions and data embodied thereon for recognizing a target individual from a plurality of individuals, comprising the steps of:
receiving a first recognition image from a sequence of recognition images, said first recognition image including a first image of the target individual at a first time;
receiving a second recognition image of the sequence of recognition images, said second recognition image including a second image of the target individual at a second time;
generating a first identification information from the first image;
detecting that a portion of the second recognition image is at least partially occluded;
generating a weighted mask including the portion of the second image; and
generating the second identification information from the second image, as adjusted by the weighted mask, and the first identification information.

26. The computer program product of claim 25, wherein the step of detecting the occlusion further comprises the step of:
determining that a group of pixels in the second image exceeds a variance threshold.

27. The computer program product of claim 26, wherein the step of determining that the group of pixels in the second image exceeds a variance threshold comprises:
determining that a first group of pixels in the second image exceeds a variance threshold with respect to a corresponding group of pixels in the first image.

28. A recognition module for recognizing a target individual, comprising:
a video buffer to receive a first recognition image from a sequence of recognition images, said first recognition image including a first image of the target individual in a first pose, the first recognition image captured at a first time, and a second recognition image of the sequence of recognition images, said second recognition image including a second image of the target individual in a second pose, the second recognition image captured at a second time;

an identity module to generate a first identification information comprising a candidate identity of the target individual based on the first image, and generate a second identification information comprising an updated identity of the target individual based on the first identification information and a likelihood that the second pose will follow the first pose in the sequence of recognition images.

29. The recognition module of claim 28, wherein the second pose is a facial position having a two-dimensional rotation with respect to the first pose.

30. The recognition module of claim 28, wherein the second pose is a facial position having a three-dimensional rotation with respect to the first pose.

31. The recognition module of claim 28, wherein the identity module further comprises a transition module to define a relationship between the first identification information and the second image, and the identity module generates the second identification information based on the relationship.

32. The recognition module of claim 28, wherein the identity module further comprises an identification control module to generate a first vector representation of the first image, project the first vector representation onto a plurality of vector representations representing a plurality of individuals, and select one or more vector representations from the plurality of vector representations having the least distance from the first vector representation.

33. The recognition module of claim 32, wherein the plurality of vector representations are pose manifolds associated with the plurality of individuals.

34. The recognition module of claim 32, further comprising a linear approximation module to generate the plurality of vector representations from a plurality of training image sequences including the plurality of individuals.

35. The recognition module of claim 32, wherein the plurality of vector representations are linear approximations of a plurality of image sequences including the plurality of individuals.

36. The recognition module of claim 28, wherein if the second identification information exceeds an identification threshold for an individual, the identify module identifies the target individual as the individual.

37. The recognition module of claim 28, wherein the video buffer receives a third recognition image, said third recognition image including a third image of the target individual at a third time, and the identity module generates a third identification information, said third identification information based on the third image and the second identification information.

38. A recognition module for recognizing a target individual, comprising:

a video buffer to receive a first recognition image from a sequence of recognition images, said first recognition image including a first image of the target individual at a first time, and a second recognition image of the sequence of recognition images, said second recognition image including a second image of the target individual at a second time;

an identity module to generate a first identification information from the first image;

an occlusion module to detect that a portion of the second recognition image is at least partially occluded;

a mask generation module to generate a weighted mask including the portion; and a mask adjustment module to generate the second identification information based on the second recognition image, as adjusted by the weighted mask, and the first identification information.

39. The recognition module of claim 38, wherein the mask generation means determines that a group of pixels in the second image exceeds a variance threshold.

40. The recognition module of claim 39, wherein the mask generation module determines that a first group of pixels in the second image exceeds a variance threshold with respect to a corresponding group of pixels in the first image.

41. A recognition module for recognizing a target individual, comprising:

a buffer means for receiving a first recognition image from a sequence of recognition images, said first recognition image including a first image of the target individual in a first pose, the first recognition image captured at a first time, and a second recognition image of the sequence of recognition images, said second recognition image including a second image of the target individual in a second pose, the second recognition image captured at a second time;

an identity means for generating a first identification information comprising a candidate identity of the target individual based on the first image, and generate a second identification information comprising an updated identity of the target individual based on the first identification information and a likelihood that the second pose will follow the first pose in the sequence of recognition images.

42. The recognition module of claim 41, wherein the second pose is a facial position having a two-dimensional rotation with respect to the first pose.

43. The recognition module of claim 41, wherein the second pose is a facial position having a three-dimensional rotation with respect to the first pose.

44. The recognition module of claim 41, wherein the identity means further comprises a transition means to define a relationship between the first identification information and the second image, and the identity means generates the second identification information based on the relationship.

45. The recognition module of claim 41, wherein the identity module further comprises an identification control means for generating a first vector representation of the first image, projecting the first vector representation onto a plurality of vector representations representing a plurality of individuals, and selecting one or more vector representations from the plurality of vector representations having the least distance from the first vector representation.

46. The recognition module of claim 45, wherein the plurality of vector representations are pose manifolds associated with the plurality of individuals.

47. The recognition module of claim 45, further comprising a linear approximation means for generating the plurality of vector representations from a plurality of training image sequences including the plurality of individuals.

48. The recognition module of claim 45, wherein the plurality of vector representations are linear approximations of a plurality of image sequences including the plurality of individuals.

49. The recognition module of claim 41, wherein if the second identification information exceeds an identification threshold for an individual, the identify module identifies the target individual as the individual.

50. The recognition module of claim 41, wherein the buffer means receives a third recognition image, the third recognition image including a third image of the target individual at a third time, and the identity means generates a third identification information, said third identification information based on the third image and the second identification information.

51. A recognition module for recognizing a target individual, comprising:

a buffer means for receiving a first recognition image from a sequence of recognition images, said first recognition image including a first image of the target individual at a first time, and a second recognition image of the sequence of recognition images, said second recognition image including a second image of the target individual at a second time;

an identity means for generating a first identification information from the first image;

an occlusion means for detecting that a portion of the second recognition image is at least partially occluded;

a mask generation means for generating a weighted mask including the portion of the second image; and a mask adjustment means for generating the second identification information from the second image, as adjusted by the weighted mask, and the first identification information.

52. The recognition module of claim 51, wherein the mask generation means determines that a group of pixels in the second image exceeds a variance threshold.

53. The recognition module of claim 52, wherein the mask generation means determines that a first group of pixels in the second image exceeds a variance threshold with respect to a corresponding group of pixels in the first image.

* * * * *